United States Patent
Athanasiou et al.

(10) Patent No.: US 12,405,218 B2
(45) Date of Patent: Sep. 2, 2025

(54) METHOD FOR THE DETECTION OF NANOPRODUCTS

(71) Applicants: FONDAZIONE ISTITUTO ITALIANO DI TECNOLOGIA, Genoa (IT); INAIL—ISTITUTO NAZIONALE PER L'ASSICURAZIONE CONTRO GLI INFORTUNI SUL LAVORO, Rome (IT)

(72) Inventors: Athanasia Athanasiou, Genoa (IT); Fabio Boccuni, Monte Porzio Catone (IT); Sergio Iavicoli, Monte Porzio Catone (IT); Paraskevi Papadopoulou, Genoa (IT)

(73) Assignees: FONDAZIONE ISTITUTO ITALIANO DI TECNOLOGIA, Genoa (IT); INAIL—ISTITUTO NAZIONALE PER L'ASSICURAZIONE CONTRO GLI INFORTUNI SUL LAVORO, Rome (IT)

( * ) Notice: Subject to any disclaimer, the term of this patent is extended or adjusted under 35 U.S.C. 154(b) by 178 days.

(21) Appl. No.: 18/549,282

(22) PCT Filed: Apr. 6, 2022

(86) PCT No.: PCT/IB2022/053211
§ 371 (c)(1),
(2) Date: Sep. 6, 2023

(87) PCT Pub. No.: WO2022/219461
PCT Pub. Date: Oct. 20, 2022

(65) Prior Publication Data
US 2024/0159679 A1    May 16, 2024

(30) Foreign Application Priority Data
Apr. 15, 2021 (IT) .................. 102021000009509

(51) Int. Cl.
*G01N 21/64* (2006.01)
*G01N 21/94* (2006.01)

(52) U.S. Cl.
CPC ....... *G01N 21/6489* (2013.01); *G01N 21/643* (2013.01); *G01N 21/94* (2013.01); *G01N 2021/6432* (2013.01)

(58) Field of Classification Search
None
See application file for complete search history.

(56) References Cited

U.S. PATENT DOCUMENTS

| 8,043,802 | B2 * | 10/2011 | Lu | C12Q 1/68 536/23.1 |
| 2011/0117025 | A1 * | 5/2011 | Dacosta | G01N 21/6486 435/5 |
| 2020/0348231 | A1 * | 11/2020 | Yu | B01J 20/3085 |

OTHER PUBLICATIONS

Gupta et al., "Paper strip based and live cell ultrasensitive lead sensor using carbon dots synthesized from biological media", Sensors and Actuators B: Chemical, 2016, vol. 232, pp. 107-114.
(Continued)

*Primary Examiner* — Marcus H Taningco
(74) *Attorney, Agent, or Firm* — LUCAS & MERCANTI, LLP (57) ABSTRACT

The present invention relates to a method for detecting silica nanoparticles and/or graphene nanoplatelets in samples of various kinds, which may be solid surfaces, air or gas streams, or liquids suspected of being contaminated. The method is based on the use of a sensor having a photoluminescent substrate for the presence of carbon dots deposited thereon.

15 Claims, 6 Drawing Sheets

(56) References Cited

OTHER PUBLICATIONS

Wang et al., "Carbon dots-based room-temperature phosphorescent test strip: Visual and convenient water detection in organic solvents", Dyes and Pigments, 2021, vol. 189, pp. 1-9.

Zhou et al., "Polymers in Carbon Dots: A Review", Polymers, 2017, vol. 9, No. 12, pp. 1-19.

Chen et al., "Portable ratiometric probe based on the use of europium(III) coordination polymers doped with carbon dots for visual fluorometric determination of oxytetracycline", Microchimica Acta, 2020, vol. 187:125, No. 2, pp. 1-8.

Das et al., "Carbon Dots: An Emerging Smart Material for Analytical Applications", Micromachines, 2021, vol. 12, No. pp. 1-36.

Senthamizhan et al,. "Hydrochromic carbon dots as smart sensors for water sensing in organic solvents", Nanoscale Advances, 2019, vol. 1, No. 11, pp. 4258-4267.

International Search Report and Written Opinion for Corresponding International Application No. PCT/IB2022/053211, 16 pages, Jun. 9, 2022.

\* cited by examiner

METHOD FOR THE DETECTION OF NANOPRODUCTS

CROSS-REFERENCE TO RELATED APPLICATIONS

This application is a 371 of PCT/IB2022/053211, filed Apr. 6, 2022, which claims the benefit of Italian Patent Application No. 102021000009509, filed Apr. 15, 2021.

FIELD OF THE INVENTION

The present invention relates generally to the field of environmental analysis for the detection of substances harmful to human health, and more specifically to a method using a photoluminescent sensor for the detection of graphene nanoplatelets and/or silicon dioxide nanoparticles.

BACKGROUND OF THE INVENTION

Silicon dioxide, also known as silica and referred as such below, when in the form of nanoparticles, i.e. respirable dust, is one of the must harmful environmental agents to human health. Silica nanoparticles are the most common type of nanoparticles because silica is widespread in nature: silica in crystalline form is the main component of minerals such as quartz and its polymorphs, and of sedimentary rocks such as sand. In addition, silica in the form of engineered nanoparticles is also intentionally produced for a wide variety of applications. In this respect, it must be said that in recent years there has been a strong increase in the production of engineered nanoparticles as they are in high demand on the market, and this has consequently led to an increase in the risk of exposure to those agents. Synthetic silica nanoparticles are in fact widely used in industry, as additives in printer inks, but also in cosmetics, pharmaceuticals and even foodstuffs where these types of nanoparticles act as an anti-caking agent in powdered products. See for example Keller A. A. et al. in *J. Nanopart. Res.* 2013, 15:1-17.

Exposure of people to silica nanoparticles can therefore occur during many activities, and can cause them to be inhaled and deposited in the lungs. Inhalation of silica in a respirable form has been associated with silicosis, a form of pneumoconiosis characterised by inflammation of lung tissue and the presence of nodular lesions in the upper lobes of the lungs. More generally, nanoparticles of different types, including silica nanoparticles, can be the cause of various diseases, from lung inflammation to asthma, and in some cases have been associated with carcinogenic effects. Recent epidemiological studies on workers exposed to synthetic silica nanoparticles, confirmed by experiments in animal models, have shown that the mechanisms of toxicity of these materials are linked to the generation of reactive oxygen species and oxidative damage. Pathological changes have also been observed in workers not equipped with personal protective equipment (Schulte P. A. et al. Scand. *J. Work Environ. Health* 2019, 45(3):217-238). In 2013, the US Occupational Safety and Health Administration (OSAH) estimated that more than 1.8 million US construction workers were exposed to silica, with 216,000 of them exposed to high concentrations, where "high concentration" means a concentration greater than or equal to 250 µg/m$^3$. The number of workers exposed to silica increased to 2.1 million when maritime and industrial occupations were included, with almost 265,000 workers exposed to high concentrations.

Even graphene, whose use in the form of nanomaterials and in particular nanoplatelets due to its conductive properties is more recent, has already been the subject of numerous toxicity studies. In a recent inhalation study on animal models, Lee et al. (in *Toxicol. Res.*, 2019, 8, 580-586) proposed an occupational exposure limit value of 18 µg/m$^3$.

In the light of these data, clearly the problem of exposure to silica nanoparticles or graphene nanoplatelets is extremely acute and that careful monitoring of this material is necessary, particularly in the workplace.

However, such monitoring is still a challenging mission to accomplish today. In fact, nowadays, the presence of silica is still monitored using conventional multi-step analysis procedures, which first require samples to be collected in the environment of interest, taken to a specialised laboratory, and analysed. According to the US OSAH, several analytical techniques are used to determine the risk of exposure to quartz and other crystalline forms of silica in the workplace. These techniques include atomic absorption, colorimetry, gravimetry, microscopy, infrared spectroscopy (IRS) and X-ray diffraction (XRD). The OSAH ID-142 method (revised October 2015; Fern Stones; Eddie Robinson; Daniel N. Johansen; Brian J. Albrecht, *Methods Development Team*, Industrial Hygiene Chemistry Division, OSHA Salt Lake Technical Center Sandy UT 84070-6406) uses the XRD technique, which is the only technique capable of quantifying silica in crystalline form, and distinguishing its polymorphs, in a wide variety of industrial powders. In this method, the samples are collected by passing the air of the workplace to be analysed through PVC (polyvinyl chloride) filters with a diameter of 37 mm and with a pore size of 5 µm, preceded by 10 mm nylon Dorr Oliver cyclones for sampling harmful dust. The samples are collected using a pump operating at a recommended sampling rate of 1.7 L/minute for 480 minutes. The weight of the respirable dust is determined by gravimetric analysis. The PVC filters are dissolved and the samples are suspended in tetrahydrofuran (THF), then deposited on silver membranes and analysed by X-ray diffraction (XRD).

Detecting graphene is equally difficult, as described in a recent article by Tombolini et al. ("An integrated and multi-technique approach to characterize airborne graphene flakes in the workplace during production phases", *Nanoscale*, 2021, 13:3841-3852).

As can be seen from the above description of this method, it is complicated, time-consuming, requires a lot of special and expensive instruments, and does not allow for real-time control.

The need for an efficient and fast system for the detection and monitoring of respirable dust, in particular silica nanoparticles and graphene nanoplatelets, which, as explained above, are widespread and of proven danger to human health, is therefore still felt in the field of environmental analytical controls and occupational medicine.

SUMMARY OF THE INVENTION

The Applicants have now found a method to detect the presence of silica nanoparticles or graphene nanoplatelets using a photoluminescent sensor comprising a substrate on which carbon dots are deposited, as described in detail below. In particular, by placing the sample to be analysed in contact with this substrate, which is photoluminescent due to the presence of carbon dots, there is a quenching of the photoluminescence in the presence of the nanoproducts mentioned above.

It is therefore an object of the invention to provide a method for detecting silica nanoparticles and/or graphene nanoplatelets in a sample by using a photoluminescent sensor comprising a substrate and carbon dots deposited on said substrate, the essential features of which are defined in the first of the appended claims. Further important features of the method according to the invention are defined in the claims dependent on the first one.

A further object of the invention is the use of said sensor for the analysis of samples suspected of being contaminated by silica nanoparticles and/or graphene nanoplatelets and/or the use for monitoring environments, objects or surfaces potentially contaminated by silica nanoparticles and/or graphene nanoplatelets.

Other important features of the sensor and its use, the process for its preparation, as well as the method for detecting the aforementioned nanoproducts according to the invention are given in the following detailed description, also with reference to the figures.

BRIEF DESCRIPTION OF THE DRAWINGS

FIGS. 1a' to 1e' show the images obtained by processing the images from FIGS. 1a to 1e with ImageJ (an image processing program developed at the NIH, USA), by separating the RGB channels and applying a coloured filter to the blue channel.

FIG. 5c shows the Energy Dispersive X-ray (EDX) spectrum recorded for the area of the magnification in FIG. 5b, and FIG. 5d shows the distribution of silicon.

FIG. 7: Images recorded under a UV lamp (at 254 nm) for a sensor strip of the method of the invention prepared as described later in the experimental part (FIG. 7a). FIG. 7b is an image of the sensor recorded under the UV lamp after exposing the sensor to graphene nanoplatelets at a concentration of 0.01 mg/mL. Figures c) and d) show the images obtained by processing the images from Figures a) and b) with ImageJ (an image processing program developed at the NIH, USA), by separating the RGB channels and applying a coloured filter to the blue channel.

In FIGS. 9c and 9d, the same two images are processed with ImageJ, as described in Example 4 of the experimental part below.

In FIGS. 10c and 10d, the same two images are processed with ImageJ, as described in Example 4 of the experimental part below.

DETAILED DESCRIPTION OF THE INVENTION

Definitions

Within the scope of the present invention, the term "sample" means any sample to be analysed for the suspected presence of silica nanoparticles and/or graphene nanoplatelets. It can be a surface on which nanoproducts are dispersed, but also a flow of gas or air, or even a solution or liquid dispersion.

The term "carbon dots" is used here to refer to carbon-based fluorescent nanomaterials smaller than 10 nm. Carbon dots are known to have excellent photo-stability, low toxicity and biocompatibility, exceptional water solubility, high sensitivity and excellent selectivity towards analytes, high quantum yield, and modulable fluorescence emission and excitation. Because of these unique characteristics, they have been greatly studied in recent years and used in various sectors, from catalysis to medical diagnostics; their use as sensors, as far as the Applicants are aware, has however so far been confined to the detection of metal ions or biological molecules in biosensing techniques. The carbon dots of the sensor of this invention can for example be prepared as described by Senthamizhan A. et al. in *Nanoscale Adv.* 2019, 1:4258-4267. In short, the preparation consists of a simple carbonisation of cane sugar, as described in the experimental part below, and depending on the degree of carbonisation, the emission wavelength of the carbon dots thus obtained can be modulated.

DETAILED DESCRIPTION

As mentioned above, this invention relates to a method for detecting silica nanoparticles and/or graphene nanoplatelets, comprising the following steps:
a) providing a photoluminescent sensor comprising a substrate and carbon dots deposited on that substrate;
b) measuring the intrinsic photoluminescence intensity of the sensor with a means adapted for such measurement;

c) bringing the sensor into contact with a sample to be analysed for the possible presence of silica nanoparticles and/or graphene nanoplatelets;

d) re-measuring the photoluminescence intensity of said sensor after having been in contact with said sample, and confirming the presence of silica nanoparticles and/or graphene nanoplatelets in the event of the quenching of the intrinsic photoluminescence of the sensor.

In one aspect of the invention, such carbon dots are carbon nanoparticles comprised between 1 and 10 nm in diameter. In another aspect of the invention, the carbon dots are comprised between 4 and 5 nm in diameter.

The substrate comprising the photoluminescent sensor and used in the method according to the invention may be any substrate, preferably not photoluminescent so as not to impair the photoluminescence of the carbon dots. It can, for example, be chosen from glass, quartz, fabric, paper, cellulose, polydimethylsiloxane (PDMS) films, and combinations thereof. In a preferred aspect the substrate is a PDMS film or cellulose, preferably a cellulose substrate such as Whatman filter paper.

Such a substrate may also comprise, depending on the process by which it is made, one or more binding agents chosen, for example, from those mentioned below.

The sensor used to implement the method of the invention may comprise the substrate with the carbon dots deposited thereon, or the sensor may comprise the substrate as a portion thereof.

The sensor useful in the method of this invention can be prepared by deposition on the substrate of a dispersion of carbon dots in a solvent. The solvent can be chosen from organic and/or aqueous solvents. In one aspect, the solvent can be chosen from water, ethanol, methanol, acetic acid, acetone, dimethyl sulfoxide, dimethylformamide, tetrahydrofuran, toluene, hexane, cyclohexane, and mixtures thereof. In one particular aspect, the solvent is water.

The resulting dispersion may also comprise at least one polymer as a binding agent. Suitable polymers are those with binding capacity, without affecting the photoluminescence of the carbon dots; if present, such polymers may be chosen from polyvinyl alcohol (PVA), polydimethyl siloxane (PDMS), chitosan, polyurethane (PU), polyethyl cyanoacrylate (PECA), and mixtures thereof.

In a preferred aspect, the carbon dot dispersion is made with only water as the solvent and includes PVA as the binding agent.

For example, the binding agent may be added to the dispersion in an amount comprised between about 1 and about 5% by weight of the total volume of the dispersion, preferably in an amount of about 5% w/v.

The concentration of carbon dots in the dispersion can vary, for example, between 0.5 and 4.0 mg/mL. When the binding agent is present, the carbon dots are dispersed in the binder at a concentration for example comprised between 5 and 50% by weight of the binder, and preferably at a concentration of about 10% by weight.

The deposition of the carbon dot dispersion on the substrate can be achieved by any suitable deposition technique, such as spray-coating, dip-coating and drop-casting. Whichever technique is used for deposition, this is followed by a step of drying the substrate, preferably at room temperature for about 24 hours.

In a preferred aspect of the sensor preparation process useful in the method of this invention, the deposition of the carbon dots on the substrate is conducted by immersing the substrate in the dispersion for a time for example comprised between 3 and 10 minutes.

In an aspect of the method, when the sample is a liquid, the sensor is subjected to drying between steps c) and d) before the photoluminescence is measured again. In a preferred aspect, this is done by leaving the sensor to dry at room temperature for about 24 hours.

The photoluminescence in the method of this invention can be measured by any means suitable for that purpose, for example with a UV lamp or a fluorometer. In the presence of silica nanoparticles and/or graphene nanoplatelets in the sample analysed, the photoluminescence of the sensor is significantly lowered (quenched).

The contact in step c) of this method may be made by any means and for a sufficient time to allow exposure of the sensor to the nanoproducts mentioned above. The technique by which contact can be made will obviously also depend on the type and shape of the sample to be analysed. If, for example, the sample to be analysed is a solution, step c) of this method consists of immersing the sensor in the solution for a time varying from a few seconds to a few minutes, preferably for a time of about 30 seconds.

The present method has been shown to have good sensitivity over a wide range of average silica nanoparticle sizes, which may be for example comprised between 10 and 100 nm, and over a wide range of nanoparticle quantities. For samples in which the silica nanoparticles were dispersed in water, for example, quenching was clearly detected by the method of the invention in a concentration range of the silica nanoparticles comprised between $2\times10^{-5}$ mg/mL and 1 mg/mL.

This is similar for graphene nanoplatelets. In an aspect of the present method, the sample dispersion to be analysed has a concentration of graphene nanoplatelets around 0.01 mg/mL.

The photoluminescent sensor described above can be used for the analysis of samples suspected of being contaminated by silica nanoparticles and/or graphene nanoplatelets, and/or for monitoring environments, objects or surfaces potentially contaminated by such nanoproducts. Such use of the sensor comprising a substrate and carbon dots deposited on it also constitutes an object of this invention.

The method of this invention is very sensitive and fast in providing a result, it does not require complex and expensive instrumentation, and it is also very versatile, being able to be used in practically any environment and with any type of sample, even to monitor the ambient air in workplaces or human activities to detect the presence of airborne silica nanoparticles and/or graphene nanoplatelets.

Furthermore, this method has the advantage of being eclectic and flexible in the sense that it can be coupled to any existing sampling device for monitoring dust in work and everyday environments, as well as being integrated into personal protective equipment for safety in the workplace.

Furthermore, as this sensor can be made with flexible substrates, particularly in the form of paper strips, it is suitable for use in conducting sweep tests, simply by passing it over a surface contaminated or suspected of being contaminated by the nanoproducts of interest mentioned above.

Finally, the sensor described herein also lends itself to being used in the method and for the use of this invention optionally combined with devices for analysing the aforementioned nanoproducts to detect their exact nature and/or with measuring devices to obtain a quantitative type determination for comparison with known quantities of silica nanoparticles or graphene nanoplatelets used as a reference.

The following experimental part is provided by way of non-limiting illustration of the present invention.

EXPERIMENTAL SECTION

Example 1

Preparation of the Sensor for Use in the Method of the Invention

The carbon dots were prepared as described by Senthamizhan A. et al. in *Nanoscale Adv.* 2019, 1:4258-4267, then immobilised on filter paper with PVA as a binder. Briefly, 5 g of cane sugar was mixed with 5 ml of water and the mixture was charred in a furnace at 180° C. for 48 hours at a heating rate of 5° C. per minute. Then the carbonised material was cooled to room temperature in a natural way, and a dispersion in distilled water was prepared. Insoluble residues were then removed by filtration through a 0.2 μm membrane filter, and the resulting solution was freeze-dried to obtain a powder of carbon dots.

Figure 1:
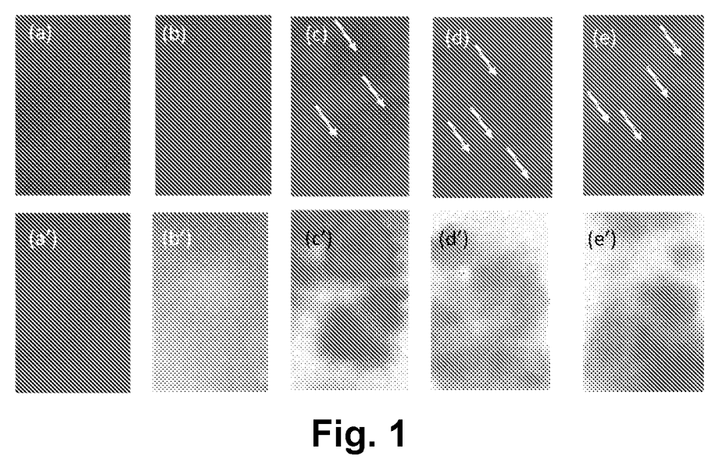
FIG. 1: Images recorded under a UV lamp (at 254 nm) for a cellulose control strip coated with PVA only (FIG. 1a) and for a sensor strip of the invention prepared as described later in the experimental part (FIG. 1b). The sensor images recorded under the UV lamp after exposing the sensor to silica nanoparticles at different concentrations are shown in FIGS. 1c (dispersion A), 1d (dispersion B), and 1e (dispersion C).

The carbon dots thus prepared had a blue emission at 448 nm, and a diameter of 4.12±0.54 nm. They were then mixed in water with PVA at a concentration of 10% by weight of the PVA, resulting in a dispersion in which a strip of Whatman filter paper was dipped for 3 minutes. A control strip was immersed for the same period of time in an aqueous solution of PVA, free from carbon dots. Both strips were then allowed to dry in the air and inspected under a UV lamp (254 nm) to determine the photoluminescence, in terms of intensity and duration. The images recorded for the two strips, the control strip and the sensor strip, are shown in FIGS. 1a and 1b respectively. In FIG. 1a it can be seen that the sensor coated with only PVA has very low fluorescence, while the sensor with carbon dots in FIG. 1b has a very bright blue colour under the same UV lamp.

Example 2

Detection of Silica Nanoparticles in Aqueous Dispersion with the Sensor of Example 1 According to the Method of the Invention Three dispersions in water were prepared at three different concentrations of engineered silica nanoparticles of approximately 50 nm in diameter: $2\times10^{-5}$ mg/mL (dispersion A), $2\times10^{-3}$ mg/mL (dispersion B), and $1\times10^{-2}$ mg/mL (dispersion C). The sensor prepared as described above in Example 1 was immersed in the three dispersions for 30 seconds, then removed and allowed to dry at room temperature. The three strips were inspected under the UV lamp and the photoluminescence was determined in terms of intensity and duration. The recorded images are shown in FIGS. 1c, 1d, and 1e, where the arrows indicate the points of decrease in fluorescence intensity on the sensor after its exposure to the silica nanoparticles. The blue colour in FIG. 1b is greatly attenuated after exposure to the silica nanoparticles, at the diffusion on the sensor of the silica nanoparticles.

The images in FIGS. 1a to 1e were processed with ImageJ (an image processing programme developed at the NIH, USA), separating the RGB channels and applying a coloured filter to the blue channel so that the patches of photoluminescence could be more easily seen, corresponding to the areas on the surface of the sensor where the silica nanoparticles are deposited (see FIGS. 1a' to 1e').

Figure 2:
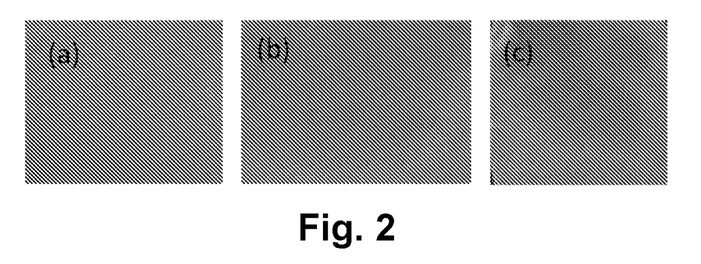
FIG. 2: Images recorded under a UV lamp (at 254 nm) for the newly prepared sensor (FIG. 2a) as described below, with the sensor after 30 seconds of immersion in water and drying at room temperature (FIG. 2b) and with the sensor after immersion for 30 seconds in the above dispersion A of silica nanoparticles (FIG. 2c)

To assess the effect of water alone on the sensor, tests were carried out under the UV lamp with the newly prepared sensor (FIG. 2a), with the sensor after 30 seconds of immersion in water and drying at room temperature (FIG. 2b) and with the sensor after immersion for 30 seconds in the above dispersion A of silica nanoparticles (FIG. 2c). In the latter image, the photoluminescence quenching is more or less pronounced depending on the distribution of silica nanoparticles on the sensor, which is much more pronounced than the homogeneous one observed in FIG. 2b due to water.

Figure 3:
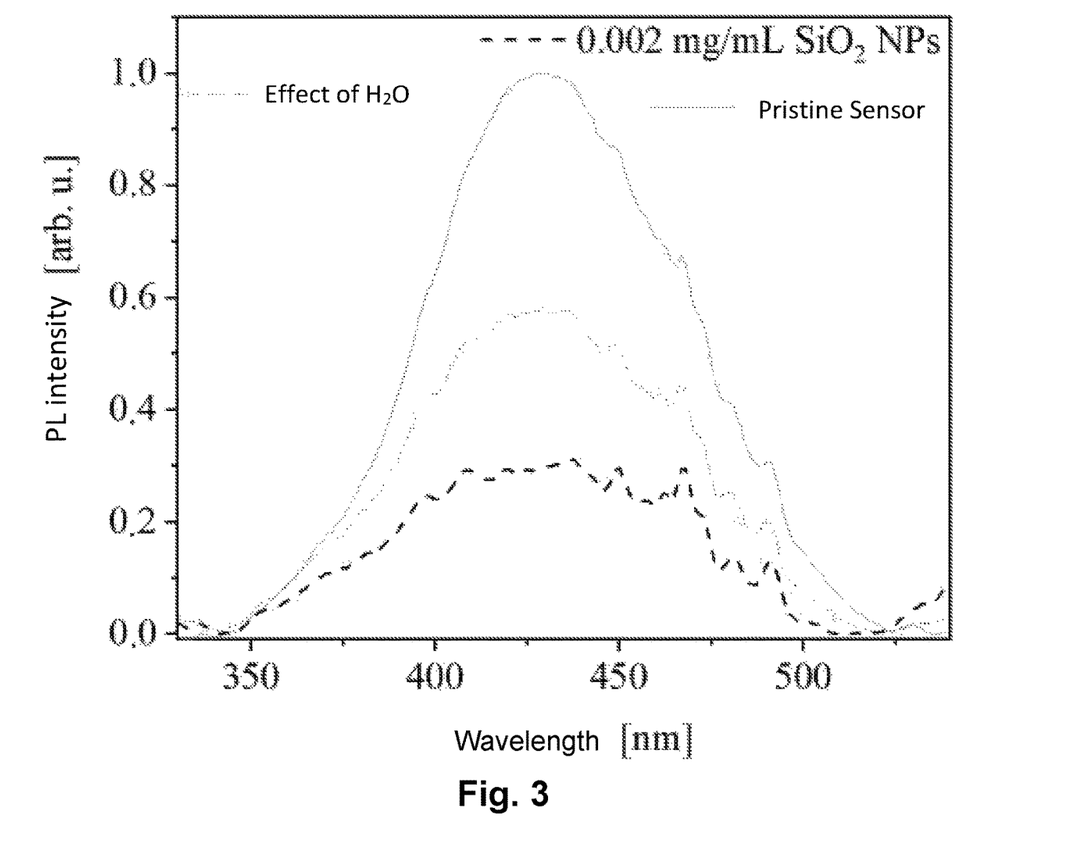
FIG. 3: Graph of photoluminescence intensity recorded with a fluorometer at varying wavelengths, for the newly prepared sensor, after immersion in water for 30 seconds and drying, and after immersion for 30 seconds in dispersion B with silica nanoparticles.

The intensity of photoluminescence was also measured with a fluorometer. FIG. 3 shows the graph of intensity recorded at different wavelengths, obtained for the newly prepared sensor, after immersion in water for 30 seconds and drying, and after immersion for 30 seconds in dispersion B with the silica nanoparticles. From the graph, it can be seen that water contributes to the quenching of photoluminescence, but only by about half, while a much greater quenching effect is observed by immersion in the dispersion also containing the nanoparticles.

Figure 4:
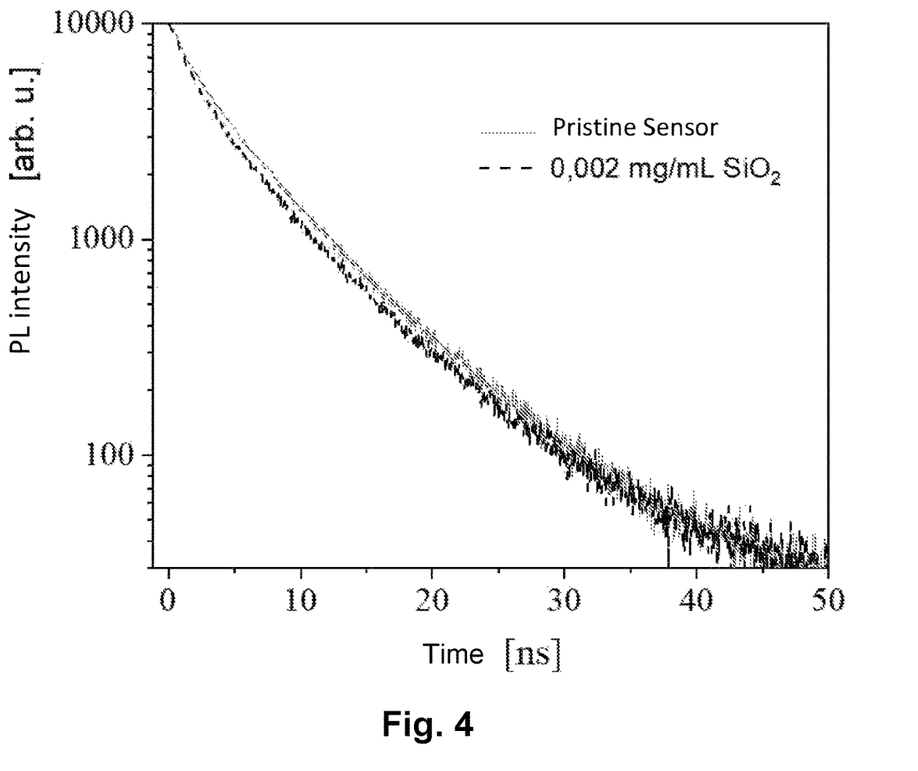
FIG. 4: Graph of photoluminescence intensity trend detected over time for the newly prepared pristine sensor of the method of the invention and for the same sensor after immersion for 30 seconds in the dispersion B of silica nanoparticles in water, using the Time-Correlated Single-Photon-Counting (TCSPC) technique.

The duration of photoluminescence was also assessed using the Time-Correlated Single-Photon-Counting (TCSPC) technique. FIG. 4 shows the photoluminescence intensity trend detected over time for the newly prepared sensor and for the same sensor after immersion for 30 seconds in dispersion B of silica nanoparticles in water. Compared to the newly prepared sensor, a change in the lifetime of the photoluminescence intensity is observed in the presence of the silica nanoparticles on the sensor.

Figure 5:
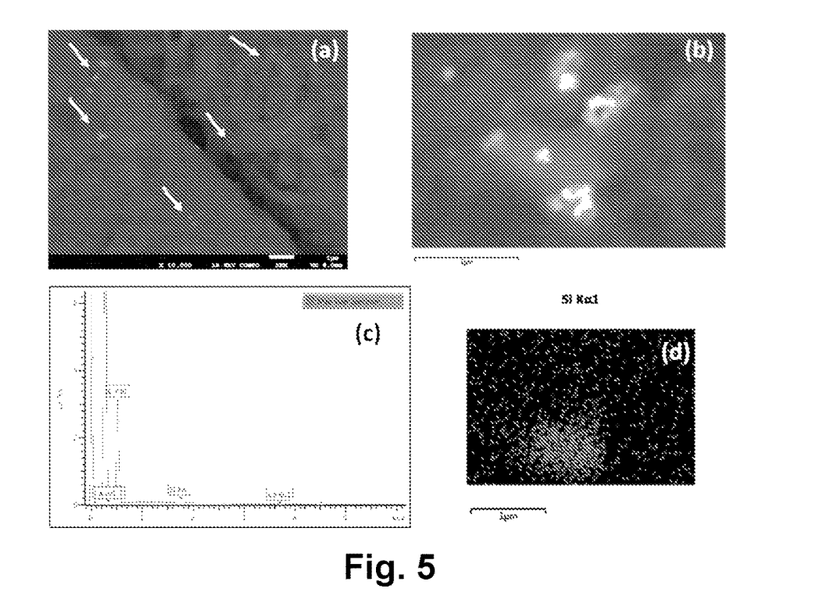
FIG. 5: Images recorded by High-Resolution Scanning Electron Microscopy (HR-SEM) of silica nanoparticles on the cellulosic fibres of the sensor of the method of the invention (FIG. 5a), with the corresponding magnification (FIG. 5b).

In order to verify the actual presence of the silica nanoparticles on the sensor after its exposure to the aqueous dispersion B containing the nanoparticles, High-Resolution Scanning Electron Microscopy (HR-SEM) was used; the recorded image of the silica nanoparticles on the cellulosic fibres of the sensor can be seen in FIG. 5a, with the corresponding magnification in FIG. 5b. An Energy Dispersive X-ray (EDX) analysis was also conducted in the magnified area to map the distribution of silicon on the fibres, resulting in the spectrum in FIG. 5c and the mapping in FIG. 5d.

Example 3

Figure 6:
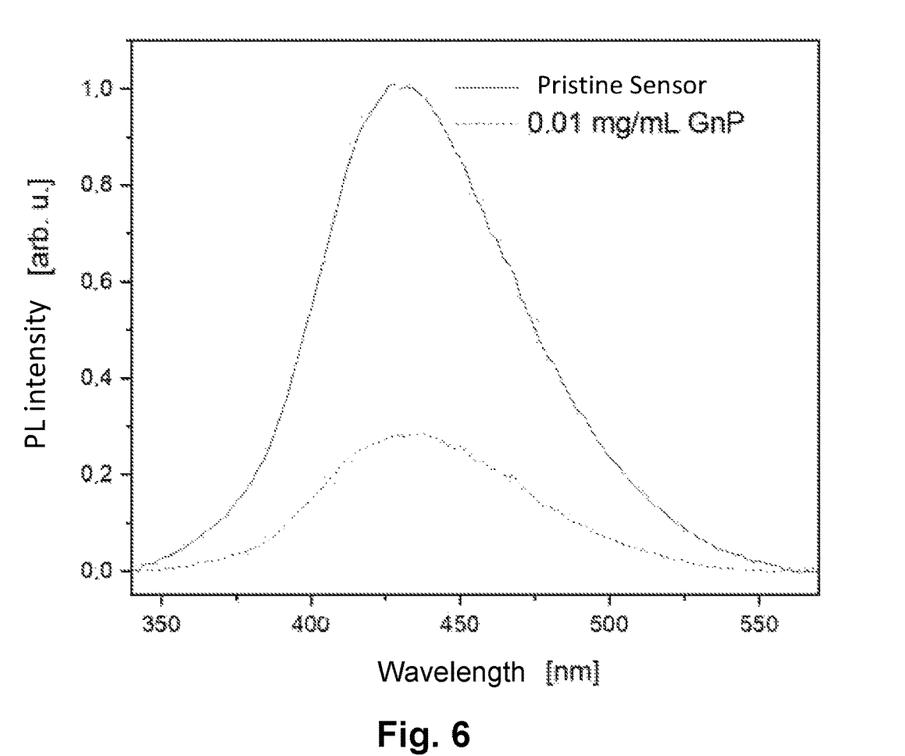
FIG. 6: Graph of the photoluminescence intensity recorded with a fluorometer at varying wavelength for the newly prepared pristine sensor of the method of the invention, and for the same sensor after immersion for 30 seconds in a dispersion of graphene nanoplatelets in water as described in Example 3 below.

Detection of Graphene Nanoplatelets in Aqueous Dispersion with the Sensor of Example 1 According to the Method of the Invention The sensor prepared as described above in Example 1 was immersed for 30 seconds in a dispersion in water of graphene nanoplatelets at a concentration of $1\times10^{-2}$ mg/mL, then extracted and allowed to dry at room temperature. The intensity of photoluminescence was also measured in this case with a fluorometer. FIG. 6 shows the graph of PL intensity (i.e. photoluminescence intensity), recorded at varying wavelengths, obtained for the newly prepared pristine sensor, and after immersion for 30 seconds in the dispersion with graphene nanoplatelets (GnP in FIG. 6). From the graph it can be seen that the quenching effect due to immersing the sensor in the dispersion containing the nanoplatelets is very significant.

Figure 7:
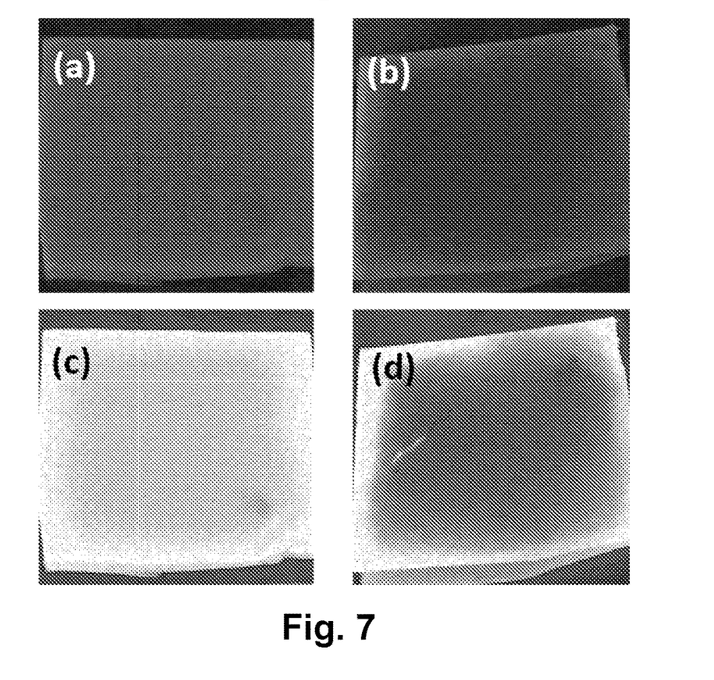

The newly prepared sensor of the invention was inspected under a UV lamp (at 254 nm) and the corresponding image is shown in FIG. 7a). FIG. 7b) shows the image of the sensor recorded under the same UV lamp but after immersion in the sample containing the graphene nanoplatelets. FIGS. 7c) and 7d) show the images obtained by processing the images in Figures a) and b) with ImageJ, separating the RGB channels and applying a coloured filter to the blue channel.

Figure 8:
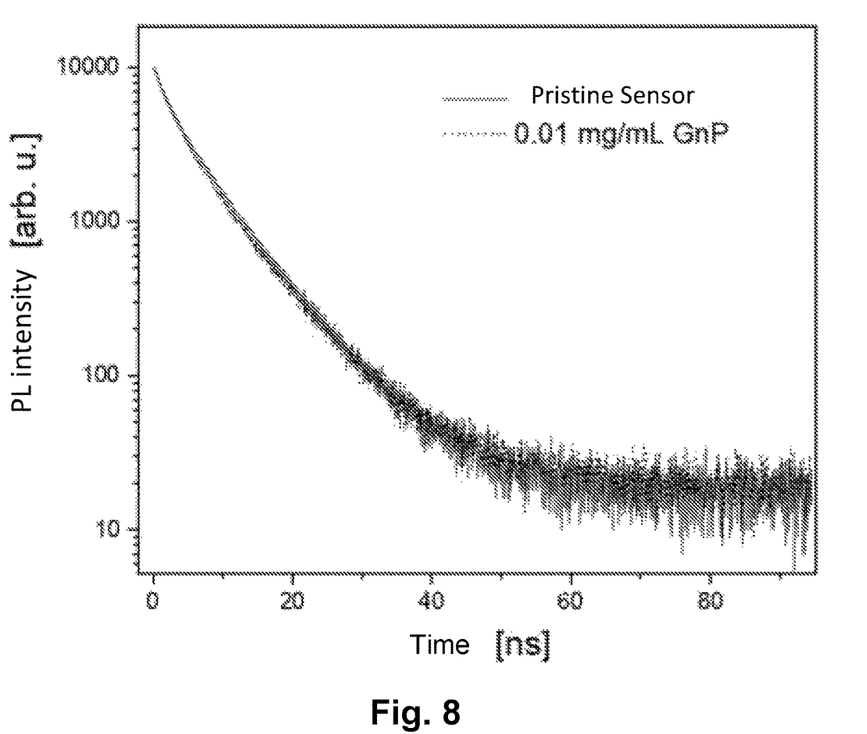
FIG. 8: Graph of photoluminescence intensity trend detected over time for the newly prepared pristine sensor of the method of the invention and for the same sensor after immersion for 30 seconds in a dispersion of graphene nanoplatelets in water, using the Time-Correlated Single-Photon-Counting (TCSPC) technique.

The photoluminescence lifetime was also assessed in this case using the Time-Correlated Single-Photon-Counting (TCSPC) technique. FIG. 8 shows the time course of the photoluminescence intensity detected for the newly prepared sensor and for the same sensor after immersion containing the graphene nanoplatelets dispersed in water.

Example 4

Detection of Silica Nanoparticles or Graphene Nanoplatelets on Surfaces with the Sensor of Example 1 According to the Method of the Invention A situation was also simulated in which the sensor in Example 1 was used to detect silica nanoparticles or graphene nanoplatelets deposited on surfaces, not dispersed in a liquid sample as in the tests described above. This situation was simulated in the laboratory using the following sweep test, in which 0.5 mg of silica nanoparticles or graphene nanoplatelets, respectively, were placed on a microscope slide. The surface of the slide was then cleaned by sweeping over it the cellulose sensor prepared as described above thereon. Subsequent inspection of the sensor under the UV lamp (254 nm) confirmed the presence of the nanoproducts, through the colour change visible in FIGS. 9 and 10, for the sweep test conducted for silica nanoparticles and graphene nanoplatelets, respectively.

Figure 9:
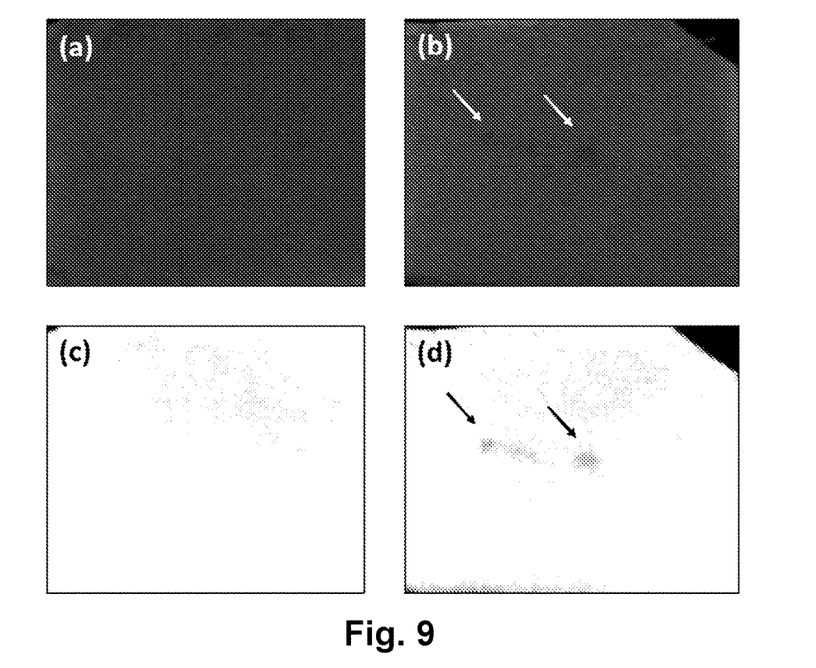
FIG. 9: Sensor images of the method of the invention under the UV lamp (254 nm) after a sweep test on a clean surface (FIG. 9a) and on surfaces contaminated with silica nanoparticles (FIG. 9b).
Figure 10:
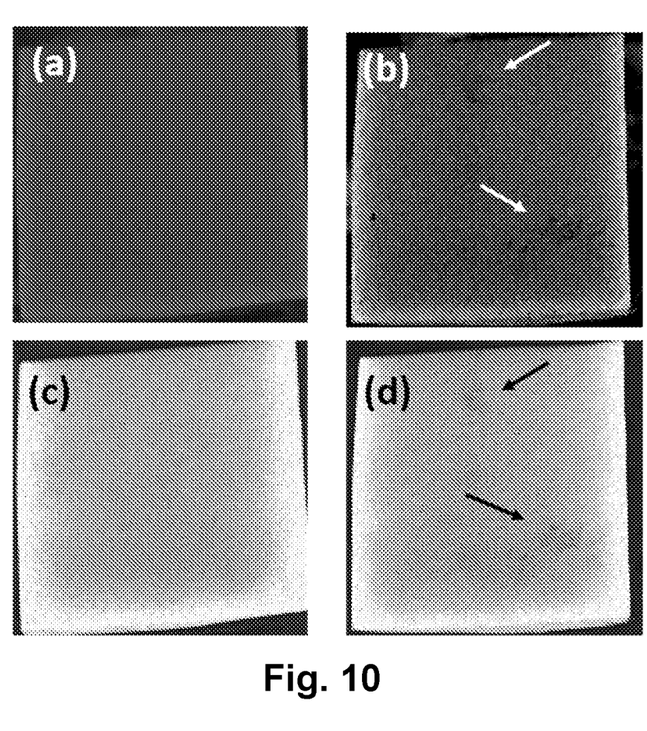
FIG. 10: Sensor images of the method of the invention under the UV lamp (254 nm) after a sweep test on a clean surface (FIG. 10a) and on a surface contaminated with graphene nanoplatelets (FIG. 10b).

FIGS. 9a) and 10a) show the images of the sensor after sweep test with the sensor rubbed on a clean surface, without nanoproducts, therefore useful as a control. FIGS. 9b) and 10b) show images of the surface of the sensors after sweep tests on surfaces contaminated with silica nanoparticles and graphene nanoplatelets, respectively. The two images in a) and b) for each test were processed using ImageJ (an image processing program developed at the NIH, USA), separating the RGB channels and applying a coloured filter to the blue channel so as to more easily see the patches of photoluminescence, and corresponding to the areas on the surface where the nanoproducts are deposited (images c) and d) in FIGS. 9 and 10).

The present invention has been described herein with reference to a preferred embodiment. It is to be understood that there may be other embodiments that relate to the same inventive nucleus, all falling within the scope of protection of the claims provided below.

The invention claimed is:

1. A method for the detection of silica nanoparticles and/or graphene nanoplatelets in a sample, comprising the following steps:
   a) providing a sensor comprising a substrate and carbon dots deposited on said substrate;
   b) measuring the intrinsic photoluminescence intensity of said sensor with means adapted for such measurement;
   c) bringing said sensor into contact with a sample to be analyzed for the possible presence of silica nanoparticles and/or graphene nanoplatelets;
   d) measuring again the photoluminescence intensity of said sensor after having been in contact with said sample, and confirming the presence of silica nanoparticles and/or graphene nanoplatelets in the event of the quenching of said intrinsic photoluminescence of the sensor.

2. The method of claim 1, wherein said carbon dots on the sensor are carbon nanoparticles between 1 and 10 nm in diameter.

3. The method of claim 1, wherein said carbon dots on the sensor are carbon nanoparticles between 4 and 5 nm in diameter.

4. The method of claim 1, wherein said sensor substrate is selected from glass, quartz, fabric, paper, cellulose, polydimethylsiloxane (PDMS) films, and combinations thereof.

5. The method of claim 1, wherein said sensor substrate is a cellulose substrate or a PDMS film.

6. The method of claim 1, wherein said sensor further comprises one or more binding agents.

7. The method of claim 6, wherein said binding agents are selected from polyvinyl alcohol (PVA), polydimethyl siloxane (PDMS), chitosan, polyurethane (PU), polyethyl cyanoacrylate (PECA), and mixtures thereof.

8. The method of claim 1, wherein said means for measuring the photoluminescence of the sensor is chosen from a UV lamp and a fluorometer.

9. The method of claim 1, wherein said sample is a solution or liquid dispersion and the step of contacting the sensor is accomplished by immersing the sensor in the sample.

10. The method of claim 1 wherein said contact step lasts for a time of 30 seconds.

11. The method of claim 9, wherein said sensor is subjected to drying between steps c) and d).

12. The method of claim 11, wherein said sensor is subjected to drying at room temperature for 24 hours.

13. The method of claim 1, wherein said sample is a solid surface contaminated or suspected of being contaminated by said silica nanoparticles and/or graphene nanoplatelets and the step of contacting the sensor is performed by sweeping the sensor over the surface.

14. A method of monitoring environments, objects or surfaces suspected of being contaminated by silica nanoparticles and/or graphene nanoplatelets, comprising the following steps:
   a) providing a sensor comprising a substrate and carbon dots deposited on said substrate;
   b) measuring the intrinsic photoluminescence intensity of said sensor with means adapted for such measurement;
   c) bringing said sensor into contact with environments, objects or surfaces to be analyzed for the possible presence of silica nanoparticles and/or graphene nanoplatelets;
   d) measuring again the photoluminescence intensity of said sensor after having been in contact with said environments, objects or surfaces, and confirming the presence of silica nanoparticles and/or graphene nanoplatelets in the event of the quenching of said intrinsic photoluminescence of the sensor.

15. The method of claim 14, wherein said sensor is combined with one or more devices for analyzing said silica nanoparticles and/or graphene nanoplatelets and/or with one or more measuring devices to obtain a determination of a quantitative type for comparison with known quantities of silica nanoparticles or graphene nanoplatelets used as a reference.

* * * * *